US008093443B2

(12) United States Patent
Timmons

(10) Patent No.: US 8,093,443 B2
(45) Date of Patent: Jan. 10, 2012

(54) SYSTEM AND METHOD FOR ACCELERATING THE CONVERSION OF ASBESTOS IN THE PROCESS OF MINERALOGICAL CONVERSION

(75) Inventor: Dale M. Timmons, Issaquah, WA (US)

(73) Assignee: ARI Technologies, Inc., Kent, WA (US)

( * ) Notice: Subject to any disclaimer, the term of this patent is extended or adjusted under 35 U.S.C. 154(b) by 530 days.

(21) Appl. No.: 11/994,072

(22) PCT Filed: Jun. 30, 2006

(86) PCT No.: PCT/US2006/026018
§ 371 (c)(1),
(2), (4) Date: Jul. 17, 2008

(87) PCT Pub. No.: WO2007/005855
PCT Pub. Date: Jan. 11, 2007

(65) Prior Publication Data
US 2009/0118566 A1    May 7, 2009

Related U.S. Application Data

(60) Provisional application No. 60/695,394, filed on Jun. 30, 2005.

(51) Int. Cl.
A62D 3/40 (2007.01)
A62D 3/30 (2007.01)
(52) U.S. Cl. .................................. 588/321; 588/313
(58) Field of Classification Search .................. None
See application file for complete search history.

(56) References Cited

U.S. PATENT DOCUMENTS

| 3,965,284 | A | * | 6/1976 | Xanthos et al. ............ 428/404 |
| 4,102,263 | A | * | 7/1978 | Forsberg ....................... 100/74 |
| 4,111,113 | A | * | 9/1978 | Lambert ....................... 100/74 |
| 4,207,021 | A | * | 6/1980 | Burdett, Jr. ................... 414/412 |
| 4,772,430 | A | * | 9/1988 | Sauda et al. ...................... 588/8 |
| 5,096,692 | A | * | 3/1992 | Ek ............................... 423/659 |
| 5,340,372 | A | * | 8/1994 | Macedo et al. ................ 65/21.1 |
| 5,676,750 | A | * | 10/1997 | Gleichmar et al. ........... 106/745 |
| 6,391,271 | B1 | * | 5/2002 | Debailleul ................. 423/167.1 |
| 2008/0207979 | A1 |  | 8/2008 | Parosa |

FOREIGN PATENT DOCUMENTS

| EP | 0145350 | * | 11/1984 |
| EP | 0265051 | * | 8/1987 |
| EP | 0418613 | A2 |  | 3/1991 |
| EP | 0568367 | A2 |  | 11/1993 |
| JP | 62237984 | A |  | 10/1987 |
| JP | 402303585 | * | 12/1990 |
| JP | 2001012721 | * | 1/2001 |
| JP | 2004257631 | * | 9/2004 |
| SU | 1168540 | * | 1/1982 |
| WO | 9100123 | A1 |  | 1/1991 |
| WO | 94/08661 | * | 4/1994 |
| WO | 97/33840 | A1 |  | 3/1997 |

OTHER PUBLICATIONS

Timmons, Dale M., "ARI Technologies Asbestos Destruction," Innovative Technology Summary Report, Tech ID 3114, Sep. 2002, pp. 1-37, Demonstrated at ARI Technologies' Facility, Tacoma, WA.

(Continued)

Primary Examiner — Melvin Mayes
Assistant Examiner — Sheng H Davis
(74) Attorney, Agent, or Firm — Seed IP Law Group PLLC

(57) ABSTRACT

A process and equipment that accelerates the rate at which asbestos is converted into non-asbestos minerals during the process of mineralogical conversion, the process consisting of new methods and equipment for handling the asbestos that promotes absorption of mineralizing agents, increases the heat transfer properties of the asbestos, increases the overall efficiency of the process, and shortens the period of time required for processing.

12 Claims, 1 Drawing Sheet

OTHER PUBLICATIONS

Figure 1:
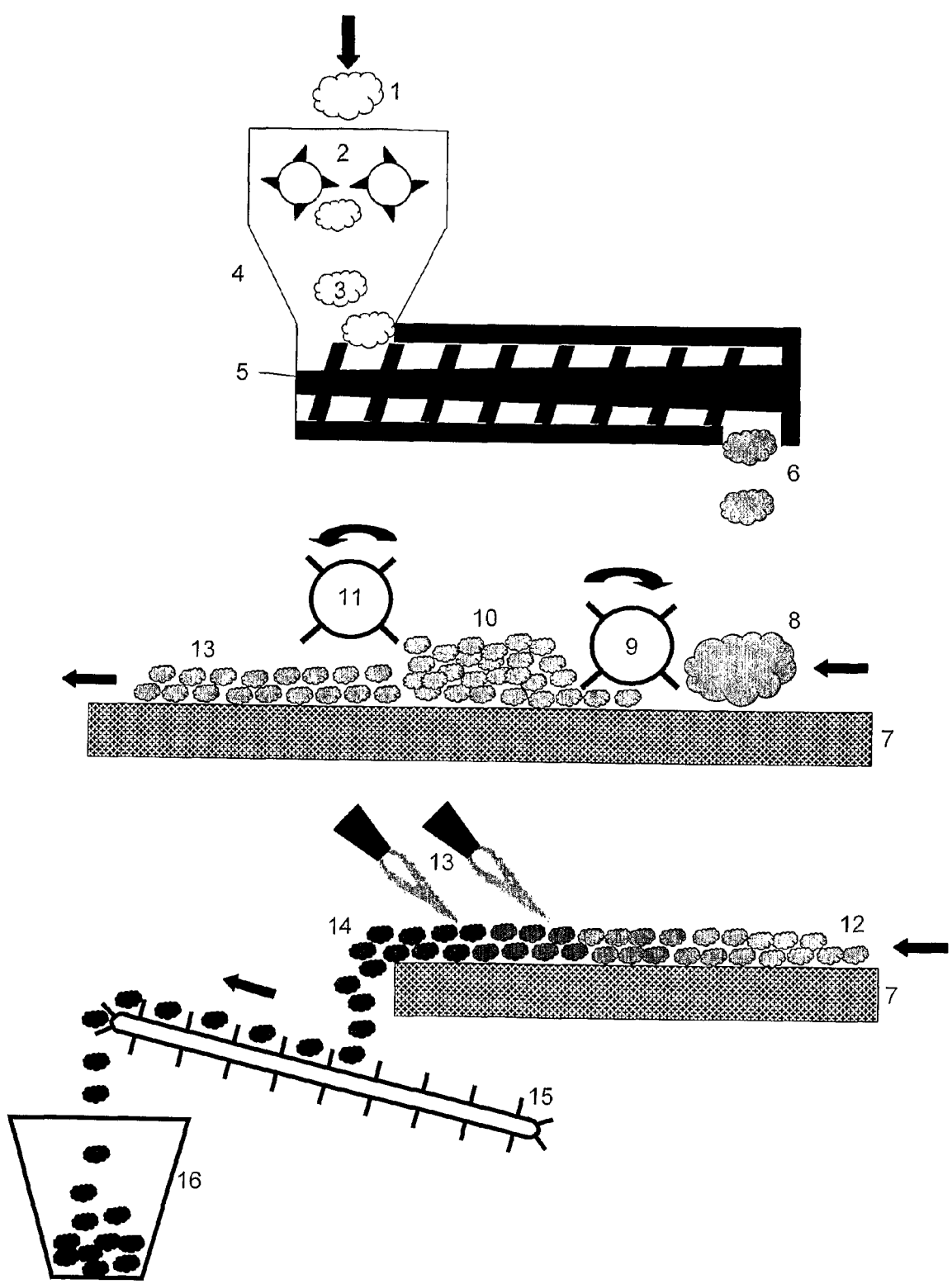

Timmons et al., "Thermochemical Conversion of Asbestos Contaminated with Radionuclides and/or other Hazardous Materials," Sep. 21-25, 2003, pp. 1-8, Proceedings of ICEM '03, The 9th International Conference on Radioactive Waste Management and Environmental Remediation, Examination School, Oxford, England.

Timmons, Dale M., "Offer to Provide Commercially Developed and Available Asbestos Destruction Technology," White Paper, Control No. BAA 2002, Jan. 17, 2002, pp. 1-6, ARI Technologies, Inc., Kent, WA.

International Search Report, mailed May 18, 2010, for PCT/US2009/058871, 7 pages.

Written Opinion, mailed May 18, 2010, for PCT/US2009/058871, 4 pages.

* cited by examiner

SYSTEM AND METHOD FOR ACCELERATING THE CONVERSION OF ASBESTOS IN THE PROCESS OF MINERALOGICAL CONVERSION

BACKGROUND OF THE INVENTION

1. Field of the Invention

The present invention relates to the destruction and recycling of asbestos wastes and, more particularly, to an apparatus and system for the process of mineralogical conversion of asbestos waste to accelerate or otherwise improve the efficiency of the mineralogical conversion process that is employed for conversion of asbestos waste into non-asbestos products.

2. Description of the Related Art

Asbestos is a term referring to a family of historically useful fibrous minerals that most commonly belong to the serpentine and amphibole mineral groups including such species as chrysotile, crocidolite, amosite, and anthophyllite. More precisely referred to as "asbestiform minerals", they are hydrated silicates that generally contain substituted iron, calcium, magnesium, and sodium in various proportions. The Serpentine group of minerals including chrysotile, antigorite and lizardite are all represented by the approximate composition: $Mg_3[Si_2O_5](OH)_4$. Of these, chrysotile represents the majority of all asbestos minerals consumed for industrial and commercial purposes. There is substantial variation in mineral chemistry and physical characteristics of asbestiform minerals but they all have similarities in basic structure that is typically modified because of variations in the concentrations of calcium, iron, magnesium and sodium.

Asbestos has been used in thousands of products and in numerous workplaces. Although the harm caused by asbestos is not apparent at first, asbestos exposure can lead to serious, debilitating, and often fatal diseases. These include mesothelioma, asbestos lung cancer, and asbestosis. Usually, a period of 10 to 40 years or more passes before the asbestos victim exhibits the first asbestos disease symptoms. In the workplace, there is no "safe" level of asbestos exposure. For this reason, increased limitations and restrictions on its use in commercial products, handling and disposal have been and continue to be imposed in many countries around the World.

As a toxic mineral, various attempts have been made to render asbestos inert. Attempts to destroy asbestos waste using heat alone to alter asbestos fiber chemistry have met with only limited success since asbestos fibers by their very nature are refractory and self-insulating. For example, chrysotile fibers have been reported to withstand temperatures up to 3000° F. for time periods of up to one-half hour. Since such a technique requires very high temperatures for fiber destruction, this approach has proved quite uneconomical.

Several vitrification (or melting) processes such as plasma melting and joule heating have shown success in destroying asbestiform minerals. However, these processes are energy intensive and require very expensive and complex equipment. Thus, vitrification processes, although capable of destroying asbestos waste have not exhibited commercial viability.

Other methods utilizing reduced process temperatures and a variety of chemical additives have also been attempted. With one exception, they have also met with limited success. The process "Mineralogical Conversion of Asbestos Waste" described in U.S. Pat. No. 5,096,692, which is incorporated in its entirety herein by reference, is the one sub-melting point process that has achieved commercial development. In that patent, asbestos waste is converted to non-asbestos products below the melting point by the combination of chemical additives and application of heat.

During the commercial development of Mineralogical Conversion of Asbestos Waste, it was found that the time required to convert 100% of the asbestos fibers in the waste took longer than that which would be required for highly competitive processing. Processing times of up to 60 minutes were required to assure that all of the asbestos fibers in the waste experienced destruction. It is desirable to reduce the processing time in order to enhance the feasibility of this process for large scale commercial applications.

BRIEF SUMMARY OF THE INVENTION

Accordingly, the disclosed embodiments of the present invention provide a process wherein asbestos that is being processed by mineralogical conversion can be subjected to methods of handling and processing that when used in combination will reduce the processing time required for 100% conversion of the asbestos from nearly 60 minutes to less than 20 minutes.

In accordance with one embodiment of the present invention, the process includes a device for tearing open plastic bags containing asbestos waste and shredding the asbestos waste into particles small enough to rapidly absorb mineralizing agents.

In accordance with another aspect of the invention, a process is provided that includes a device to compress the pre-prepared (shredded & fluxed) asbestos waste for the purpose of increasing the density of the waste, which in turn increases the rate of heat transfer from the furnace environment to the waste.

In accordance with another aspect of the invention, the process includes a device for breaking up the particles of compressed waste within the furnace environment for further increasing the rate of heat transfer from the furnace to the waste particles.

In accordance with another embodiment of the invention, a process is provided for another device that spreads the asbestos waste in such a manner that the waste is subjected to uniform and consistent heat transfer in the down-stream portions of the furnace environment.

In accordance with another embodiment of the invention, a process is provided for an array of fuel burners that point hot flame directly at the asbestos waste in carefully selected regions of the process that result in rapid temperature increase of the asbestos waste but does not melt the waste.

In accordance with another embodiment of the invention, a process is provided for another device that removes the hot, converted product produced from mineralogical conversion and transfers the product in the hot condition (without cooling) for temporary storage.

DETAILED DESCRIPTION OF THE INVENTION

Asbestos waste is normally broken into manageable size pieces during removal. Water sprays are usually applied to prevent the release of fibers that might be generated during the removal process. The wet asbestos material is then transported in polyethylene disposable bags for disposal.

Asbestos waste materials removed in such a manner are composed of asbestos fibers and usually contain other fibers of inorganic or organic origin along with other materials such a Portland cement, gypsum, plaster, dolomite, and a variety of silicates. The term asbestos waste is used herein to include the asbestos mixtures mentioned above as well as any asbestos mineral fibers, including the minerals chrysoltile, amosite, anthophyllite, crocidolite and other commercial and industrial asbestos minerals collectively known as asbestos, and includes mixtures of asbestos mineral fibers with additive or matrix substances including inorganic and organic materials.

Once the asbestos waste is removed from an installation site, it is subsequently transported to a processing or disposal facility. In the process of Mineralogical Conversion, mineralizing agents are then added to the waste. It was found that by tearing open the plastic bags containing the asbestos and simultaneously shredding the asbestos contained in the bags, the mineralizing agent was more readily absorbed into the waste, thus reducing processing time. Shredding can be accomplished using any number of available devices including but not limited to a slow speed rip-shear shredder or crosscut shredder.

After the asbestos is shredded, it is in a very low-density form. This low-density form promotes a high degree of self-insulation and imposes volumetric limits on the amount of waste that can be introduced into the conversion system. This, in turn severely limits the number of tons of asbestos that can be processed per unit time for a given conversion system. Several feed mechanisms were used to attempted to introduce the asbestos into the conversion system including a screw conveyor and ram feed. These mechanisms did not compact or compress the asbestos. Processing benefits were realized by compressing the asbestos into a higher density form. Compression can be accomplished by using a press, ram, screw conveyor, extrusion device or other device specifically designed for increasing the density of the asbestos. The benefits discovered from compressing the asbestos include: 1) a higher rate of heat transfer to a larger mass of waste, 2) higher rates of heat conduction in the compacted waste compared to the un-compacted waste, and 3) a higher tonnage throughput capability for a given conversion system.

In the process of Mineralogical Conversion, mineralizing agents are added to the asbestos, which is then heated. The mineralizing agents include, but are not limited to, the mineralizing agents listed in U.S. Pat. No. 5,096,692, the disclosure of which is incorporated in its entirety herein. This process causes asbestos to convert into non-asbestos minerals. After the asbestos is compressed, it is introduced into the furnace to be heated. The particles of compressed asbestos can be quite large and the larger particles take longer to convert than the smaller particles. Thus, it was found that by breaking up the particles into a smaller, uniform consistency, processing time could be reduced and the particles would all experience conversion in about the same period. The device used to break up the large asbestos particles included an insulated rotating shaft with blades protruding from the shaft at such an angle that efficient contact with the asbestos is achieved. When the shaft rotates, the blades contact the asbestos and break it into consistently sized pieces. The shaft's rotational speed, rotational direction and height above the furnace floor can be adjustable, and the shaft can be cooled using air or fluid. The number of blades on the shaft, their position, their angle and their length can also be adjustable.

The shaft that breaks up the asbestos tends to pile the asbestos particles on the furnace floor unevenly. Consequently, there is a need for a second shaft that is similar to the first shaft but rotates in the opposite direction. This second shaft serves three purposes, all of which improve processing efficiency. The second shaft (1) stirs up the asbestos particles thus exposing cooler particles that are buried inside of the pile to the high-temperature of the furnace atmosphere, (2) spreads the asbestos on the furnace floor to achieve a consistent thickness and (3) spreads the asbestos to achieve more complete coverage of waste on the furnace floor.

When the asbestos has been converted into non-asbestos material, it is removed from the furnace. Historical practice has been to drop the hot converted product into water to facilitate rapid cooling and to simplify the post-process handling. It was found that by not immediately and rapidly cooling the product with water, asbestos conversion would continue for a short period following removal from the conversion system. Following this short period, small amounts of water can be sprayed on the converted asbestos to simplify subsequent handling. This practice also eliminated the wastewater generated from the cooling process. The practice of handling the converted product in the hot condition requires the use of equipment specifically designed to handle hot materials and to prevent the release of fugitive emissions until the converted product can be tested. This equipment can consist of, but is not limited to, an auger conveyor or other type of conveyor designed to operate while in contact with hot materials equipped with a housing that may be vented to the conversion system or separately to a filter.

A preferred system used in carrying out the process of the present invention is illustrated in FIG. 1. Asbestos waste 1 is introduced into a shredding system 2 where the plastic bags and contained asbestos are size-reduced for purposes of rapid absorption of mineralizing agent. The size-reduced asbestos 3 passes through a mixer 4 and enters the compaction device 5, in this case a screw 5, although the device can be a ram, auger, press as described above that compresses and discharges the material. Ideally, the compaction device compresses the asbestos to a minimum density in the range of 40 to 60 pounds per cubic foot and preferably 50 pounds per cubic foot where it is discharged 6 onto the furnace surface 7. The compressed asbestos 8 encounters the granulating shaft 9, which breaks the compressed asbestos into smaller particles 10.

The blades on the granulating shaft 9 are, in one embodiment, generally flat, planar, rectangular-shaped metal segments mounted in axial alignment with the longitudinal axis of the shaft 9. Each blade is fixedly attached with suitable fasteners in an orientation to achieve the level of particle size desired for each particle 10. The orientation of the blades can be individually changed by stopping the rotation and removing the shaft, remounting the blade or blades in the new orientation, and then reinstalling the shaft 9. Blades of different length and configuration can be used to meet the needs of a particular installation. Because of the high temperatures in the furnace, the blades cannot be adjusted during operation of the system.

In operation, the granulating shaft 9 can be rotated from the slowest speed desired up to an approximate maximum speed of 120 RPM. The particles 10 are broken by the interaction of the blades and the floor or hearth of the furnace. The distance between the granulating shaft 9 and the furnace floor or hearth can be adjusted to vary the particle size.

After passing through the granulating shaft 9, the compressed, size-reduced asbestos encounters the stirring/spreading shaft 11, which spreads the asbestos to expose previously buried asbestos particle surfaces to the furnace environment and to achieve a consistent thickness of asbestos 12 on the furnace surface or hearth. The second shaft 11 preferable rotates in a direction opposite to the first shaft 9 so that blades on the second shaft 11 move into contact with the particles 10 in a direction opposite to the direction of travel of the particles 10. The second shaft 11 has the same construction as the first shaft 9, and it can be adjusted in the same manner, including blade configuration and orientation, distance from the furnace floor, and speed of rotation.

Fuel burners 13 located at the downstream area of the process are pointed directly at the asbestos expose it to intense heat. The compacted, size-reduced asbestos 12 is converted into non-asbestos products 14 where it is discharged into the transport device 15. The transport device is housed in a negative atmosphere housing (not shown). Hot converted asbestos products are transported to a storage container 16 to await testing.

Example 1

Asbestos was soaked in mineralizing agent and then introduced into the conversion system and processed for 60 minutes at 2200° F. Conversion was observed to take place with the smaller particles but did not convert all of the larger particles. Upon examination of larger particles, it was found that mineralizing agent had not saturated to the center of the particle.

Example 2

Asbestos contained in plastic bags was processed with a rip-shear shredder and then saturated with mineralizing agent. The asbestos was then introduced into the conversion system. The asbestos possessed a density of approximately 30 pounds per cubic foot and was introduced into the conversion system with an auger conveyor that did not compress the asbestos. Observations showed that conversion occurred on the surfaces of the piles of the asbestos within the conversion system but the interior portions of the piles remained unconverted after 60 minutes of processing at 2200° F. In order to achieve complete conversion, only small quantities of asbestos could be introduced to achieve a thickness of 2 inches or less on the furnace surface. The low density of the asbestos combined with the asbestos thickness limitation severely limited the mass of asbestos that could be processed in a given period.

Example 3

Asbestos contained in plastic bags was processed with a rip-shear shredder and then saturated with mineralizing agent. Plastic and other debris was removed from the asbestos and then briquettes were made from the asbestos with the intent of increasing the density of the asbestos. Small quantities of the briquettes were placed in a nickel "boat" and subjected to 2250° F. for 10, 15, 20, 30 and 60 minutes in a tube furnace. Following treatment, the briquettes were examined with an electron microprobe to determine if conversion had taken place. It was found that conversion had proceeded to completion in all samples.

Example 4

Asbestos contained in plastic bags was processed with a rip-shear shredder and then saturated with mineralizing agent. The asbestos was then introduced into a device designed to produce briquettes on a production basis from the asbestos with the intent of increasing the density of the asbestos. It was observed that the briquettes did not possess the cohesiveness required to maintain their integrity and they fell apart before they could be introduced into the conversion system. The presence of particles of plastic and other foreign materials and the high moisture content caused this lack of cohesiveness. It was determined that briquetting could not be applied for this type of wastes at any reasonable rate.

Example 5

Asbestos contained in plastic bags was processed with a rip-shear shredder and then saturated with mineralizing agent. The asbestos was then compressed using a hydraulic ram that increased the density of the asbestos to approximately 50 pounds per cubic foot and produced a "brick" approximately 3 inches thick, 18 inches wide and approximately 24 inches long. The brick was introduced into the conversion system for 60 minutes at 2200° F. The outer edges of the brick experienced conversion but the interior portions did not. Another brick was introduced into the conversion system but this time the brick was manually broken up into smaller particles and spread out on the furnace surface using a metal tool resembling a garden hoe with a long handle. Once broken up, the asbestos experienced conversion in 35 minutes.

Example 6

Asbestos contained in plastic bags was processed with a rip-shear shredder and then saturated with mineralizing agent. The asbestos was then compressed using a hydraulic ram that increased the density of the asbestos to approximately 50 pounds per cubic foot and produced a "brick" approximately 3 inches thick, 18 inches wide and approximately 24 inches long. The brick was introduced into the conversion system. The brick was broken up with a rotating shaft equipped with blades. The blades effectively broke up the brick but then piled the smaller particles of asbestos behind the shaft such that the piles were too thick to accomplish conversion in the interior portions of the piles in a reasonable period. The test was repeated but this time the piles were spread out manually on the furnace surface to achieve a constant thickness. And two propane burners were directed at the asbestos at the downstream portion of the furnace. Conversion then occurred in 20 minutes.

Example 7

Asbestos was removed from the furnace manually and not subjected to cooling in water. The converted asbestos was observed to remain "red hot" for approximately 1 minute following removal from the conversion system. The temperatures required to produce illumination from heat are sufficient to promote conversion of asbestos. By not cooling the product, conversion can continue for a short period following removal from the conversion system thus reducing the residence time in the conversion system. By using materials designed to withstand the high temperature of the converted product to transport the product and to house the transport system, it was found that conversion could continue for 1 to 2 minutes following removal thus shortening the required residence time by up to 10%.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A process for accelerating the rate at which asbestos can be converted into asbestos-free minerals in the process of mineralogical conversion of asbestos waste that is accomplished without melting the asbestos waste comprising:
   shredding whole bags of asbestos waste to increase the surface area available for absorption of mineralizing agent,
   applying a mineralizing agent to the shredded asbestos waste and the shredded whole bag,
   compressing the shredded asbestos waste and the shredded whole bag to increase the density and thus the heat transfer properties,
   breaking up the compressed asbestos and shredded whole bag into smaller particles to increase the rate of heat transfer,
   spreading the broken up particles onto a furnace floor to achieve consistent, predictable conversion rates, applying intense direct flame on the asbestos waste in selected portions of the furnace without melting the asbestos waste and the shredded whole bag to achieve a converted product that is asbestos free, and
   handling the converted product while hot with handling mechanisms and confining the handling mechanisms in a negative atmosphere to prevent the release of fugitive emissions.

2. The process of claim 1 wherein the bags and contained asbestos are shredded to reduce particle size and promote absorption of mineralizing agent.

3. The process of claim 1 wherein the asbestos and shredded whole bag is compressed into a brick to increase the heat-transfer properties.

4. The process of claim 1 wherein the asbestos brick and shredded whole bag is broken up into smaller particles inside of the furnace.

5. The process of claim 1 wherein the broken up asbestos and shredded whole bag is spread evenly on the furnace floor to promote consistent heating.

6. The process of claim 1 wherein the flame from a burner is pointed directly at the converting asbestos to boost the rate of conversion at the end of the process.

7. The process of claim 1 wherein the converted asbestos and shredded whole bag are removed in the hot condition to promote prolonged conversion and enclosed to prevent escape of fugitive emissions.

8. A process, comprising:
   shredding asbestos waste in whole bags to increase the surface area of the asbestos waste;
   applying a mineralizing agent to the shredded asbestos waste and shredded whole bag;
   compressing the shredded asbestos waste and shredded whole bag to increase the density;
   breaking up the compressed asbestos waste and shredded whole bag into smaller particles;
   spreading the broken up smaller particles onto a surface of a furnace for heat treatment in a furnace; and
   applying direct flame on the smaller particles in selected portions of the furnace to yield converted non-asbestos product at a temperature that avoids melting of the smaller particles.

9. The process of claim 8, further comprising handling the converted non-asbestos product while hot with handling mechanisms and confining the handling mechanisms in a negative atmosphere to prevent the release of fugitive emissions.

10. The process of claim 8, wherein the asbestos waste is initially contained in plastic bags, and the step of shredding comprises shredding the bagged asbestos waste with a rip-shear shredder; and the application of mineralizing agent comprises saturating the shredded asbestos waste and the shredded whole bag with the mineralizing agent.

11. The process of claim 8, wherein compressing the shredded asbestos and shredded whole bag comprises using a hydraulic ram to increase the density of the shredded asbestos waste and shredded whole bag to approximately 50 pounds per cubic foot and forming the compressed asbestos waste and shredded whole bag into brick form.

12. The process of claim 8, wherein spreading the broken up smaller particles comprises spreading the broken up particles onto the surface of the furnace to have a constant thickness.

* * * * *